June 5, 1962 R. NOACK ETAL 3,037,434
PHOTOGRAPHIC CAMERA
Filed June 20, 1960 2 Sheets-Sheet 1
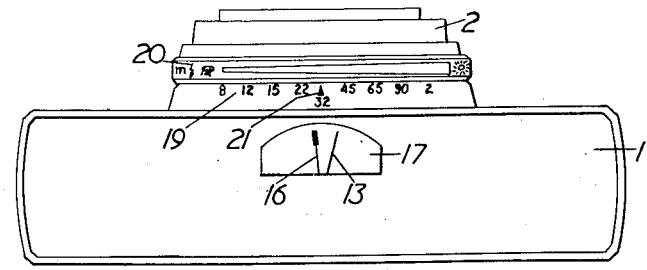
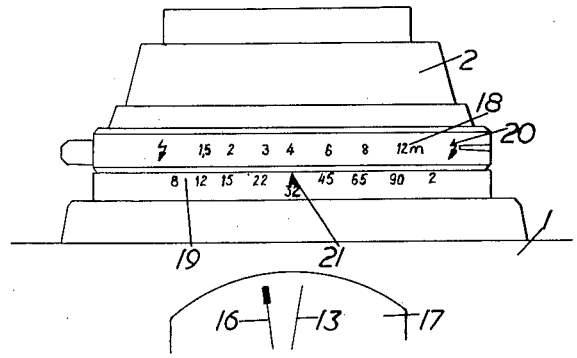
Inventors
ROLF NOACK
WERNER HAHN
By Irwin S. Thompson
Attorney Inventors
ROLF NOACK
WERNER HAHN
By Irvin S. Thompson
Attorney United States Patent Office 3,037,434
Patented June 5, 1962

3,037,434
PHOTOGRAPHIC CAMERA
Rolf Noack and Werner Hahn, Dresden, Germany, assignors to VEB Kamera- und Kinowerke Dresden, Dresden, Germany
Filed June 20, 1960, Ser. No. 37,122
5 Claims. (Cl. 95—10)

The present invention relates to a photographic camera having a preferably interchangeable objective lens, the built-in diaphragm of which is set or pre-selected by a setting ring on the camera or shutter side, and the invention has for its purpose the provision of a pre-set control arrangement for the diaphragm and the exposure time mechanism.

The devices which have become known hitherto for the setting of the diaphragm and of the exposure time mechanism by a single device according to a previously determined programme or relationship between the exposure times and the diaphragm settings were unsuitable for the requirements of the interchangeability of objective lenses. The couplings, consisting of gear wheels or other positive connections, between the mechanisms for the diaphragm and the exposure time were more especially a hindrance for this purpose. Furthermore, the known devices possessed the disadvantage that they did not readily permit settings for flashlight exposures. Any conventional switch-off mechanisms to be provided for this purpose for pre-set control would however to a large extent again cancel the facilitation of setting precisely sought by the said pre-set control, because additional handles would have to be operated.

It is the task of the invention, avoiding the above-stated disadvantages, to provide a pre-set control arrangement suitable for the requirements of the interchangeability of objective lenses, and at the same time to adapt this pre-set control arrangement to the requirements for flashlight picture-taking.

In accordance with the invention this is achieved due to the fact that the setting ring on the camera or shutter side, through preferably axially movable push-rods, shifts the diaphragm on the lens side, the exposure time mechanism on the shutter side, and the follow-up pointer of an exposure meter on the camera side. The operative connection preferably selected between the push-rods and the setting ring permits the setting ring to be freely rotatable, so that it can be rotated any number of times in either direction. For the purpose of the execution of flashlight exposures the setting ring may be rotated in either direction to a region in which it merely sets the diaphragm, with maintenance of an exposure time (for example 1/30 sec.) suitable for flashlight exposures, a distance auxiliary scale being preferably provided, and arranged to come opposite a scale with values for flash guide numbers when the setting ring is in this region. In consequence of a requisite characteristic of the setting range specified for flash exposures the distance auxiliary scale and the flash guide number scale have special marks. Furthermore, in this range intended for flash exposures a control cam of the setting ring expediently pivots the follow-up pointer out of the window of the exposure meter, in order that coincidence of the two pointers, which is reserved for daylight exposures, may become impossible. The details of the invention may be seen from an illustrated and described example of embodiment.

FIGURE 1 shows the overall view of a camera with the setting ring in the region for daylight pictures, and rotatable to cause the meter and the follow-up pointers to coincide;

FIGURE 2 shows the arrangement of the distance auxiliary scale on the setting ring, which has been rotated from the region shown in FIGURE 2 to the flashlight picture region.

Figure 3:
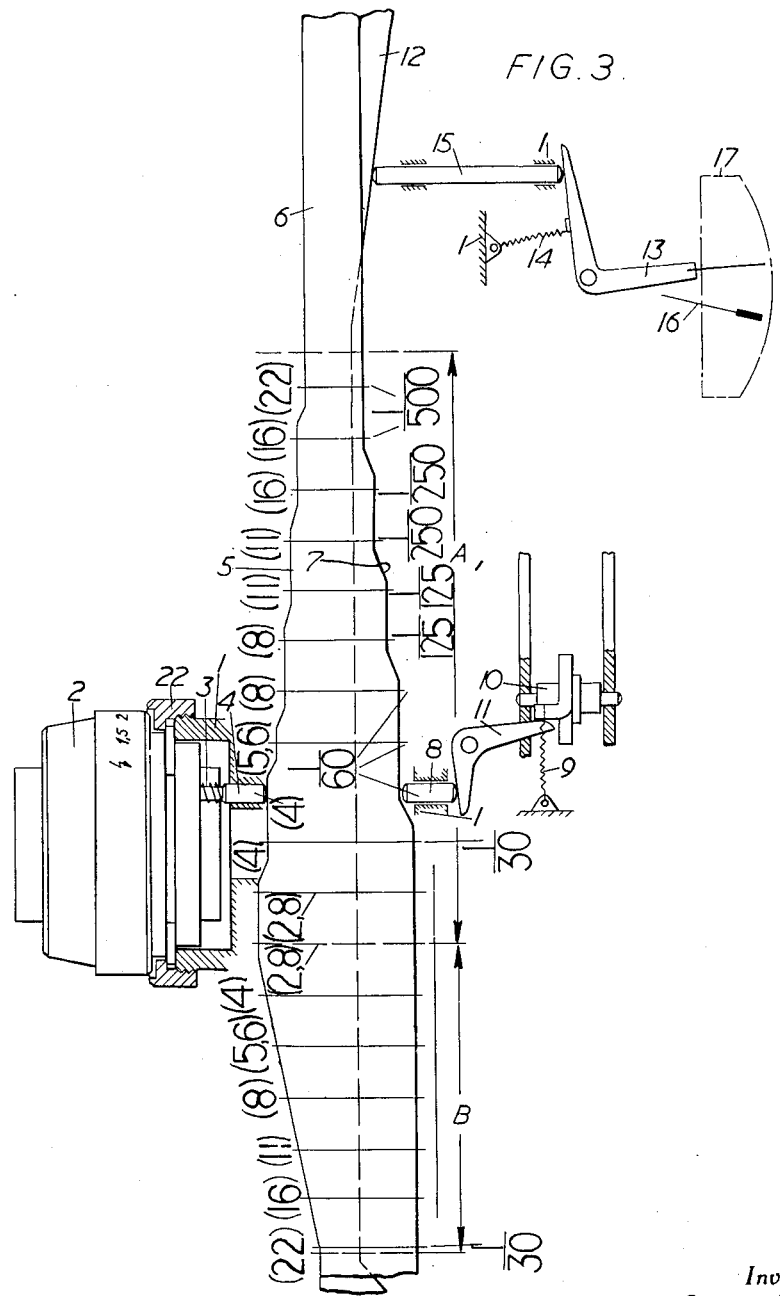
FIGURE 3 shows the control device with a part of the developed setting ring.

The camera 1 (see FIGURE 1) carries on its front the interchangeable objective lens 2 (see FIGURES 1 and 2), which possesses a built-in diaphragm. A spring 3 (see FIGURE 3) seeks to draw the diaphragm into its smallest aperture and to press the push-rod 4 against the control cam 5 of the setting ring 6. The setting ring 6 also possesses a control cam 7. As a result of the spring 9 the push-rod 8 places itself against this control cam 7, the spring 9 being secured to the exposure time mechanism 10 and a bell-crank lever 11 being arranged between the said exposure time mechanism 10 and the push-rod 8. As a result of the spring 14 secured to the follow-up pointer 13 the push-rod 15 places itself against a further control cam 12 of the setting ring 6. The follow-up pointer 13 is visible together with the instrument pointer 16 of an exposure meter (not separately shown) in a window 17.

The setting ring 6 is provided with the distance auxiliary scale 18 which is rotated to a region opposite a flash guide number scale 19 arranged on the housing, when flashlight pictures are to be taken. Two marks 20 on both sides of the distance auxiliary scale 18 correspond with a counter-mark 21 arranged on the housing. When both marks 20 lie to the same side of the counter mark, this indicates that a correctly exposed picture cannot be taken at the given distance with the given flashbulb.

In order that both daylight exposures and flash exposures may be effected with the setting ring 6 without actuation of special change-over members, the control cams 5 and 7 of the setting ring 6 are divided into two control ranges A and B. In the control range A the control cams 5 and 7 shift the diaphragm and the exposure time mechanism, the shifting steps on the cams 5 and 7 being mutually staggered, while in the control range B, with maintenance of an exposure time (for example 1/30 sec.) suitable for flash exposures only the diaphragm is shifted. In this control range B the above-mentioned distance auxiliary scale 18 is effective. Furthermore, in this control range B the control cam 12 moves so far back that the follow-up pointer 13 is pivoted out of the window 17.

The manner of operation of the new device is as follows:

By tightening of the bayonent ring 22 the objective lens 2 desired in each case is connected firmly with the camera 1. Here the diaphragm aperture corresponding to the momentary position of the setting ring 6 is automatically set by pressing in of the push-rod 4 against the spring 3.

If daylight exposures are to be carried out, then the setting ring 6 is rotated in region "A" until the follow-up pointer 13 lies over the instrument pointer 16. In this rotation, the diaphragm on the objective side is adjusted by the control cam 5, and also the exposure time mechanism on the shutter side is adjusted by the control cam 7, according to the measure of the pre-set programme imparted to the setting ring through the control cams 5 and 7.

In the case of flash exposures, merely by rotation of the setting ring 6, by means of the distance auxiliary scale 18, the value of the distance between flash lamp and the object of which a picture is to be taken is placed opposite the flash guide number of the flash lamp used, on the flash guide number scale 19. Without the exposure time here changing, the correct diaphragm value is produced automatically. It must merely be observed that the counter-mark 21 does not pass out of the control range B indicated by marks 20. If this should be the case with the flash lamp selected and with the set distance, a proper exposure is not possible. Only by variation of the distance or by the selection of a different flash lamp can an exposure be effected.

We claim:

1. In a photographic camera having a casing, a window in the casing, a shutter device mounted on the casing, an adjustable aperture diaphragm in the shutter device, an exposure time adjusting mechanism coupled to the shutter device, an exposure meter having a moving-coil, and a meter pointer connected to said moving coil, and normally visible in the window, the provision of a rotatable setting ring having first and second regions of rotation, two control cams connected to the setting ring, adapted for controlling the aperture diaphragm and the exposure time adjusting mechanism respectively, each control cam having a first control range and a second control range corresponding to the two setting ring rotational regions respectively, two push-rods co-acting with the control cams and operably coupled to the aperture diaphragm and the exposure time adjusting mechanism respectively, and a follow-up pointer coupled to the setting ring, the first ranges on the control cams being such that in the first rotational region of the setting ring the diaphragm aperture and the exposure time are adjustable by the setting ring, whereby the follow-up pointer may be made to coincide with the meter pointer to indicate readiness for picture-taking, and the second ranges on the control cams being such that in the second rotational region of the setting ring the diaphragm aperture and the exposure time are adjustable as required for flashlight picture-taking.

2. A camera according to claim 1, the further provision of a distance auxiliary scale and a flash guide number scale mounted one on the casing and the other on the setting ring in such a position as to be opposite each other when the setting ring is in its second rotational region.

3. A camera according to claim 1, wherein the setting ring is mounted to be freely rotatable.

4. In a camera according to claim 2, the further provision of marks on the distance auxiliary scale and flash guide number scale indicating the limits of the setting range for flash exposures.

5. In a camera according to claim 2, the further provision of means to pivot the follow-up pointer out of the window upon rotation of the setting ring to the second region.

References Cited in the file of this patent
UNITED STATES PATENTS

| | | |
|---|---|---|
| 2,887,026 | Rentschler | Mar. 19, 1959 |
| 2,926,571 | Sommer | Mar. 1, 1960 |
| 2,953,978 | Rentschler | Sept. 27, 1960 |